(12) United States Patent
Lingafelt et al.

(10) Patent No.: US 11,003,761 B2
(45) Date of Patent: May 11, 2021

(54) INFERRED ACCESS AUTHENTICATION DECISION FOR AN APPLICATION

(71) Applicant: INTERNATIONAL BUSINESS MACHINES CORPORATION, Armonk, NY (US)

(72) Inventors: Charles S. Lingafelt, Durham, NC (US); Gregory J. Boss, Saginaw, MI (US); Andrew R. Jones, Round Rock, TX (US); John E. Moore, Jr., Pflugerville, TX (US); Kevin Charles Mcconnell, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 308 days.

(21) Appl. No.: 16/122,570

(22) Filed: Sep. 5, 2018

(65) Prior Publication Data
US 2020/0074072 A1   Mar. 5, 2020

(51) Int. Cl.
*G06F 21/00* (2013.01)
*G06F 21/46* (2013.01)
*H04L 29/06* (2006.01)

(52) U.S. Cl.
CPC .......... *G06F 21/46* (2013.01); *H04L 63/083* (2013.01); *H04L 63/105* (2013.01); *H04L 63/108* (2013.01)

(58) Field of Classification Search
CPC ... H04L 63/105; H04L 63/12; H04L 63/0853; H04L 63/83; G06F 21/46
USPC .................................................. 726/6
See application file for complete search history.

(56) References Cited

U.S. PATENT DOCUMENTS

| | | | |
|---|---|---|---|
| 7,010,691 B2 * | 3/2006 | Wheeler | H04L 63/083 380/277 |
| 8,474,025 B2 | 6/2013 | Royer | |
| 8,918,479 B2 | 12/2014 | O'Connell et al. | |
| 9,432,361 B2 * | 8/2016 | Mahaffey | H04W 12/003 |
| 9,749,308 B2 | 8/2017 | Jones-McFadden et al. | |
| 2006/0136997 A1 | 6/2006 | Telek et al. | |
| 2016/0248748 A1 | 8/2016 | Caterino et al. | |

FOREIGN PATENT DOCUMENTS

EP       1050790 A2    11/2000

OTHER PUBLICATIONS

In Common LLC, "Identity Assurance Assessment Framework," Version 1.2, Feb. 11, 2013 (25 pages).

(Continued)

*Primary Examiner* — Longbit Chai
(74) *Attorney, Agent, or Firm* — Griffiths & Seaton PLLC (57) ABSTRACT

Embodiments for implementing an inferred access authentication decision for an application by a processor. A minimum required credential strength of a current authentication process for an application is compared to a previous, successful authentication for the application. The minimum required credential strength of application is inferred to be sufficient to validate the current authentication process upon determining a minimum required credential value (AMRCV) is greater than a predetermined threshold of the previous successful authentication for the application.

20 Claims, 6 Drawing Sheets

(56) References Cited

OTHER PUBLICATIONS

Alterman et al., "White Paper: E Authentication Partnership Policy on Levels of Assurance of Identity for Authentication of Electronic Identity Credentials," Assurance Level Workgroup Policy, Version 1.0, 2003 (27 page).
Anonymous, "Revalidation Hashes for Authentication Credentials," An IP.com Prior Art Database Technical Disclosure, IPCOM000238645D, Sep. 9, 2014 (4 pages).
Muther, "Strong Risk-based Authentication without Human Intervention," An IP.com Prior Art Database Technical Disclosure, IPCOM000228058D, Jun. 4, 2013 (5 pages).
Anonymous, "Quick fingerprint secure authentication," An IP.com Prior Art Database Technical Disclosure, IPCOM000203560D, Jan. 28, 2011 (3 pages).

\* cited by examiner

INFERRED ACCESS AUTHENTICATION DECISION FOR AN APPLICATION

BACKGROUND OF THE INVENTION

Field of the Invention

The present invention relates in general to computing systems, and more particularly to, various embodiments for inferred access authentication decision for an application by a processor.

Description of the Related Art

In today's society, consumers, businesspersons, educators, and others communicate over a wide variety of mediums in real time, across great distances, and many times without boundaries or borders. The advent of computers and networking technologies have made possible the intercommunication of people from one side of the world to the other. With the proliferation of these technologies, computer system may be accessed from practically anywhere. Today's information systems contain private information, individually sensitive information or personalized information, which many computing systems are required to protect.

SUMMARY OF THE INVENTION

Various embodiments for implementing an inferred access authentication decision for an application by a processor, are provided. In one embodiment, by way of example only, a method for implementing an inferred access authentication decision for an application, again by a processor, is provided. A minimum required credential strength of a current authentication process for an application is compared to a previous, successful authentication for the application. The minimum required credential strength of application is inferred to be sufficient for the current authentication process upon determining a minimum required credential value (AMRCV) is greater than a predetermined threshold of the previous successful authentication for the application.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Authentication is the process of determining whether someone or something is, in fact, who or what it is declared to be. In private as well as public computer networks, authentication is commonly performed through the use of login passwords. Knowledge of the password is assumed to guarantee that the user is authentic. Each user registers initially (or is registered by someone else), using an assigned or self-declared password. On each subsequent use, the user must know and use the previously declared password. One primary weakness in this approach is that passwords can be stolen, accidentally revealed, or forgotten. For example, a username and password credentials may be insufficient and not strong enough to protect various resources. A second factor authentication (2FA) may be used to measure and enhance security of protected resources. 2FA may require extra/additional steps and creates additional "friction" for users to go through to authenticate.

Accordingly, various aspects of the present invention provides a solution to improve authentication by determining if a user is required to authentication upon launch of an application through inferred authentication. In one aspect, a reference monitor may be provided, and minimum application credential strength values may be defined. Recent user authentication events may be compared with a previous application authentication process. A determination operation may be performed to determine whether the previous authentication event met or exceeded the defined minimum credential value. If the previous authentication event met or exceeded the defined minimum credential value of the current authentication, the current authentication may be inferred. Thus, the number of authentication attempts without having to evaluate the actual authentication credential is reduced.

In an additional aspect, the present invention provides for inferred access authentication decision for an application. A minimum required credential strength of a current authentication process for an application is compared to a previous, successful authentication for the application. The minimum required credential strength of application is inferred to be sufficient for the current authentication process upon determining a minimum required credential value (AMRCV) is greater than a predetermined threshold of the previous successful authentication for the application.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
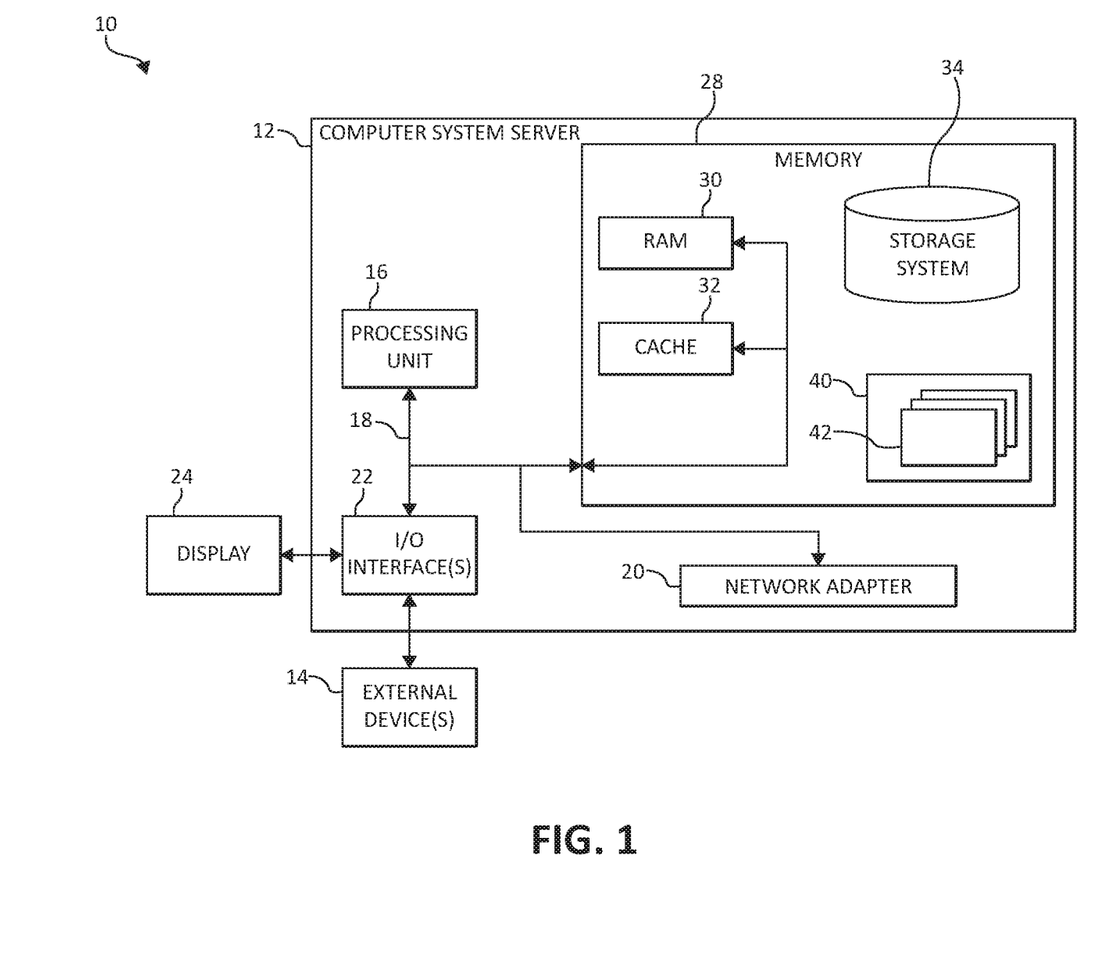
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
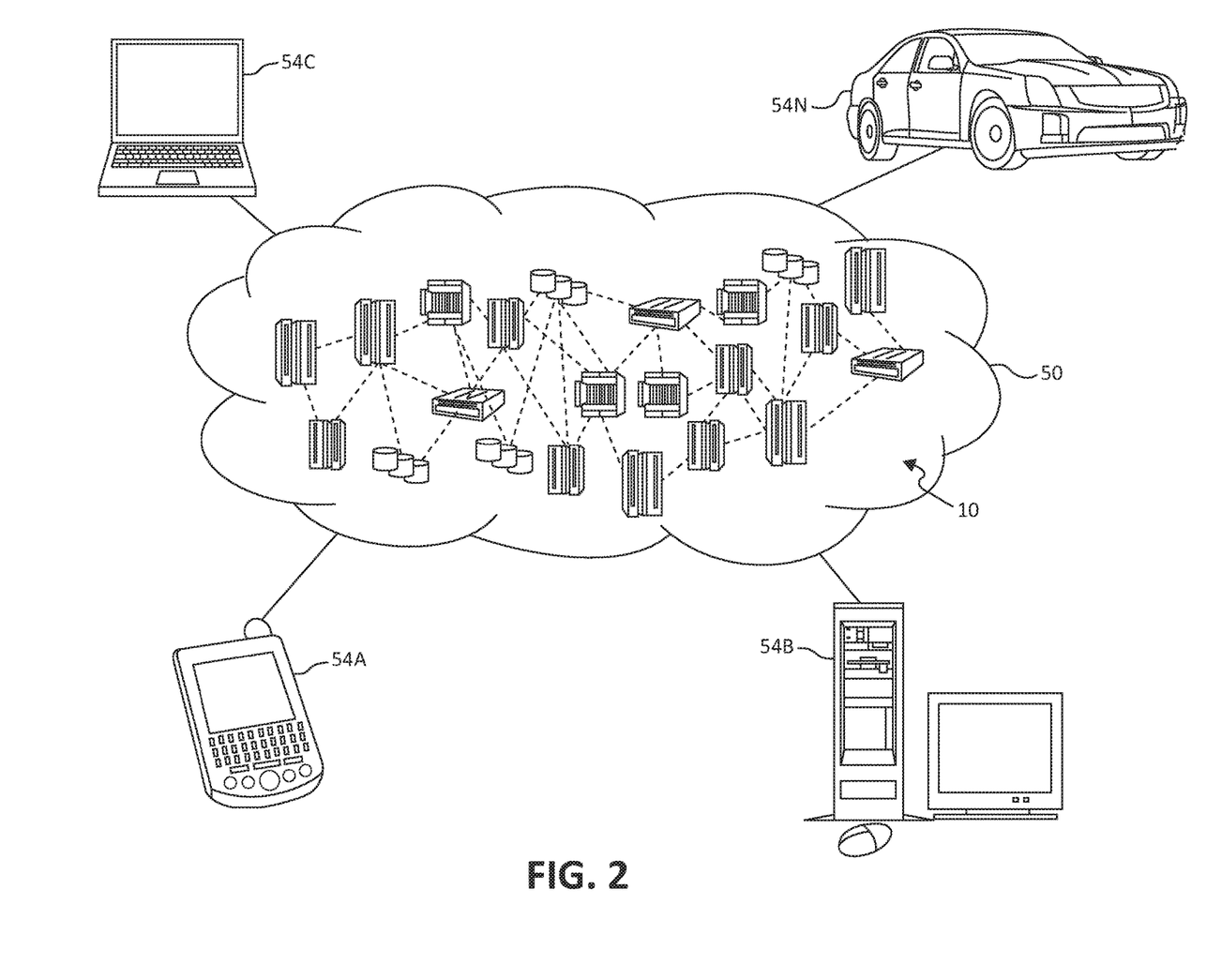
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
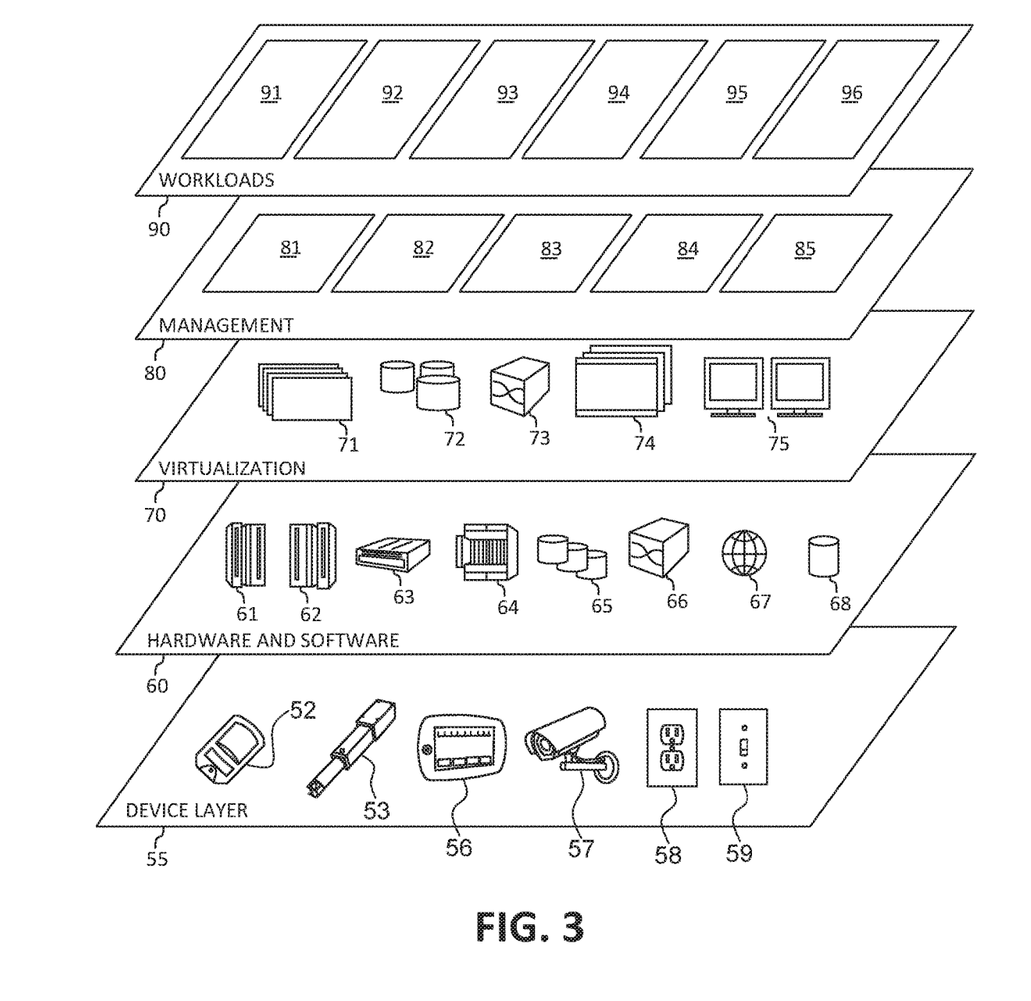
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC(Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for inferred access authentication decision for an application. In addition, workloads and functions 96 may include such operations as data analytics, data analysis, and as will be further described, notification functionality. One of ordinary skill in the art will appreciate that the workloads and functions 96 for inferred access authentication decision for an application may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

Figure 4:
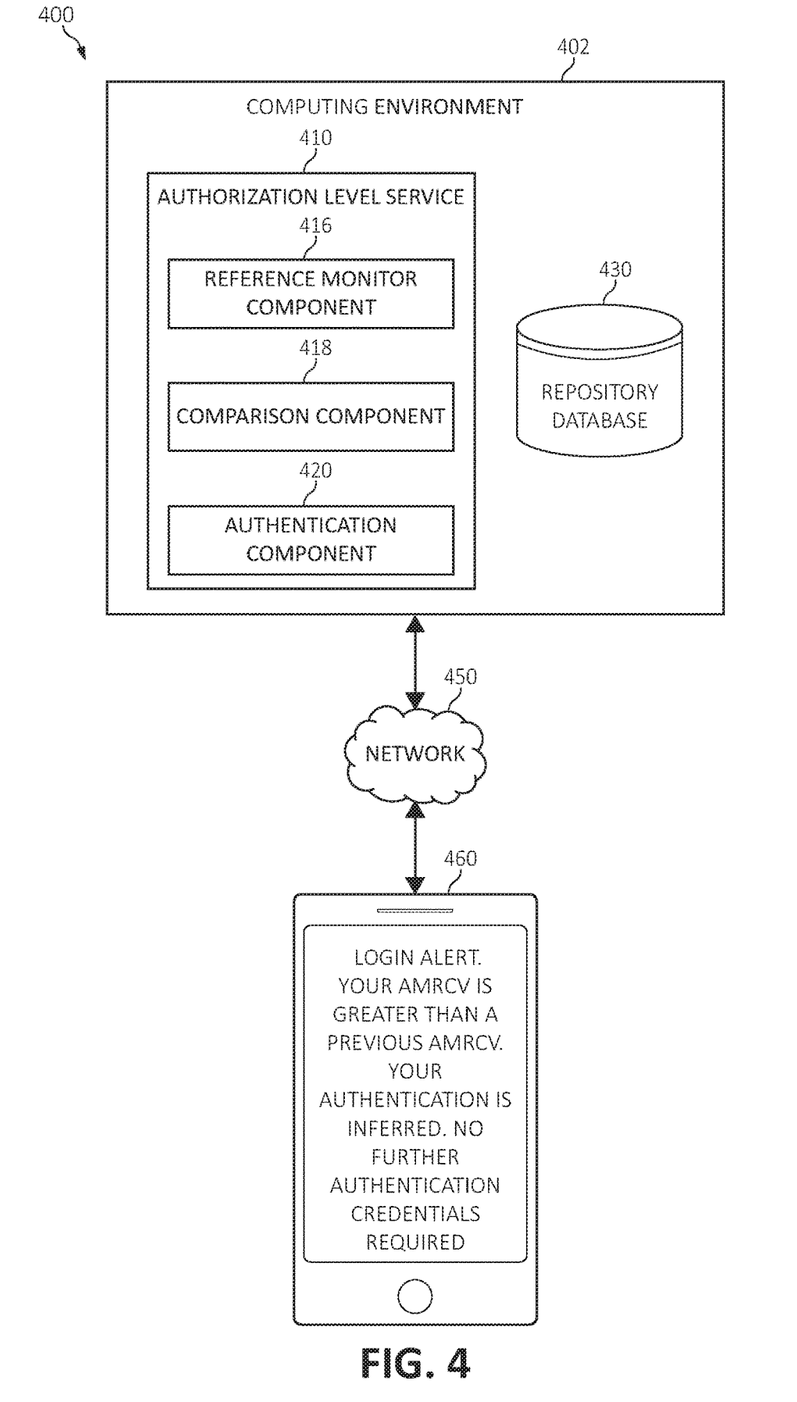
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. FIG. 4 illustrates generating an inferred access authentication decision for an application in a computing environment, such as a computing environment 402 (e.g., a cloud computing environment), according to an example of the present technology. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for inferred access authentication decision for an application in accordance with the present invention. Many of the functional blocks 400 may execute as background processes on various components, either in distributed computing components, or on the user device, or elsewhere.

The system 400 may include the cloud computing environment 402, an authorization level service 410, and one or more devices such as, for example, device 460 (e.g., a desktop computer, laptop computer, tablet, smartphone, and/or another electronic device that may have one or more processors and memory). The device 460 (e.g., an IoT device), the authorization level service 410, and the computing environment 402 may each be associated with and/or in communication with each other, by one or more communication methods, such as a computing network 450. In one example, the device 460, the authorization level service 410, and the computing environment 402 may be controlled by an owner, customer, or technician/administrator associated with the computing environment 402. In another example, device 460, the authorization level service 410, and the computing environment 402 may be completely independent from the owner, customer, or user of the computing environment 402.

In one aspect, the computing environment 402 may provide virtualized computing services (i.e., virtualized computing, virtualized storage, virtualized networking, etc.) to device 460. More specifically, the computing environment 402 may provide virtualized computing, virtualized storage, virtualized networking and other virtualized services that are executing on a hardware substrate. In one aspect, the one or more IoT devices 470 may communicate with the device 460 using network 450.

As depicted in FIG. 4, the computing environment may include a repository database 430 and the authorization level service 410, which may include a reference monitor component 416, a comparison component 418, and/or authentication component 420. The authorization level service 410 may be in communication with a repository database 430, and/or a data, services, and resources access, which may be included within and/or external to computing environment 402.

In one aspect, repository database 430 may be a third party repository and/or may be if integrated as part of the computing environment 402. The repository database 430 may include a catalog of items (e.g., software, SaaS properties, resources, etc.) that may store and act as an authority for the AMRCV metadata. Additionally, repository database 430 may be included/built into any mobile device management ("MDM") suite. The repository database 430 may be stored in a cloud hosting environment or an encrypted repository on a workstation.

The reference monitor component 416 may identify the minimum required credential strength for the application using an AMRCV. The comparison component 418 may compare a minimum required credential strength of a current authentication process for an application to a previous, successful authentication for the application. The reference monitor component 416 may define a selected period of time for inferring the minimum required credential strength of an application is sufficient to validate the current authentication process.

The authentication component 420 may infer the minimum required credential strength of application to be sufficient to validate the current authentication process upon determining the AMRCV is greater than a predetermined threshold of the previous successful authentication for the application. The authentication component 420 may require additional credentials for the current authentication upon determining the AMRCV is greater than a previous AMRCV of the previous successful authentication for the application. The authentication component 420 may grant the current authentication based on the AMRCV being equal to or less than a previous AMRCV of the previous successful authentication for the application.

The authentication component 420 may store the AMRCV in metadata of the application and/or in the database repository 430 for establishing the minimum required credential strength.

The reference monitor component 416 may rank a strength of the AMRCV for the minimum required credential strength. The authentication component 420 may, upon a successful, first authentication operation to the application for the current authentication, require additional authorization credentials upon expiration of a timer and/or upon determining the ranking of the AMRCV is less than a previous ranking of a previous AMRCV for the previous successful authentication for the application.

Thus, an application may have a defined AMRCV that may be added to application metadata (e.g., precompiled code) or the repository database 430 that associates the AMRCV's with application UNIDs. When a user is prompted to log into a first application via computing device 460, the reference monitor component 416 may be consulted to determine how strong the authentication is required to be (e.g., strength "34" from 1 to 100 with 1 being the least strong credential strength and 100 being the strongest credential strength and 50 being a medium value level). Upon successful login, the reference monitor component 416 notes that the user has provided the necessary challenge responses for an application at that rating (e.g., "34") and starts a timer. If the next challenge for credentials is provided prior to expiration of a selected time period and/or if an application with a strength ranking less than the "most_recent_authentication_strength_used_by_an_application" (e.g., less than "34") is accessed, then no additional authentication credentials are required to be entered. The previous login "implies" that the provided authentication credentials are sufficiently strong such as, for example, greater than a defined threshold. Moreover, in the event that the AMRCV is "35" or greater (in this scenario) or the timer has expired, the user may then be prompted to login in with the proper challenge credentials and the time is started again (or reset if not expired). Thus, the reference monitor component 416 reference monitor to evaluate the AMRCV of recent authentication events and determine if a current authentication is required.

For example, the device 460 may display, via an interactive graphical user interface ("GUI"), a notification such as, for example, "Login Alert. Your AMRCV is greater than a previous AMRCV. Your authentication is inferred. No further authentication credentials required."

Figure 5:
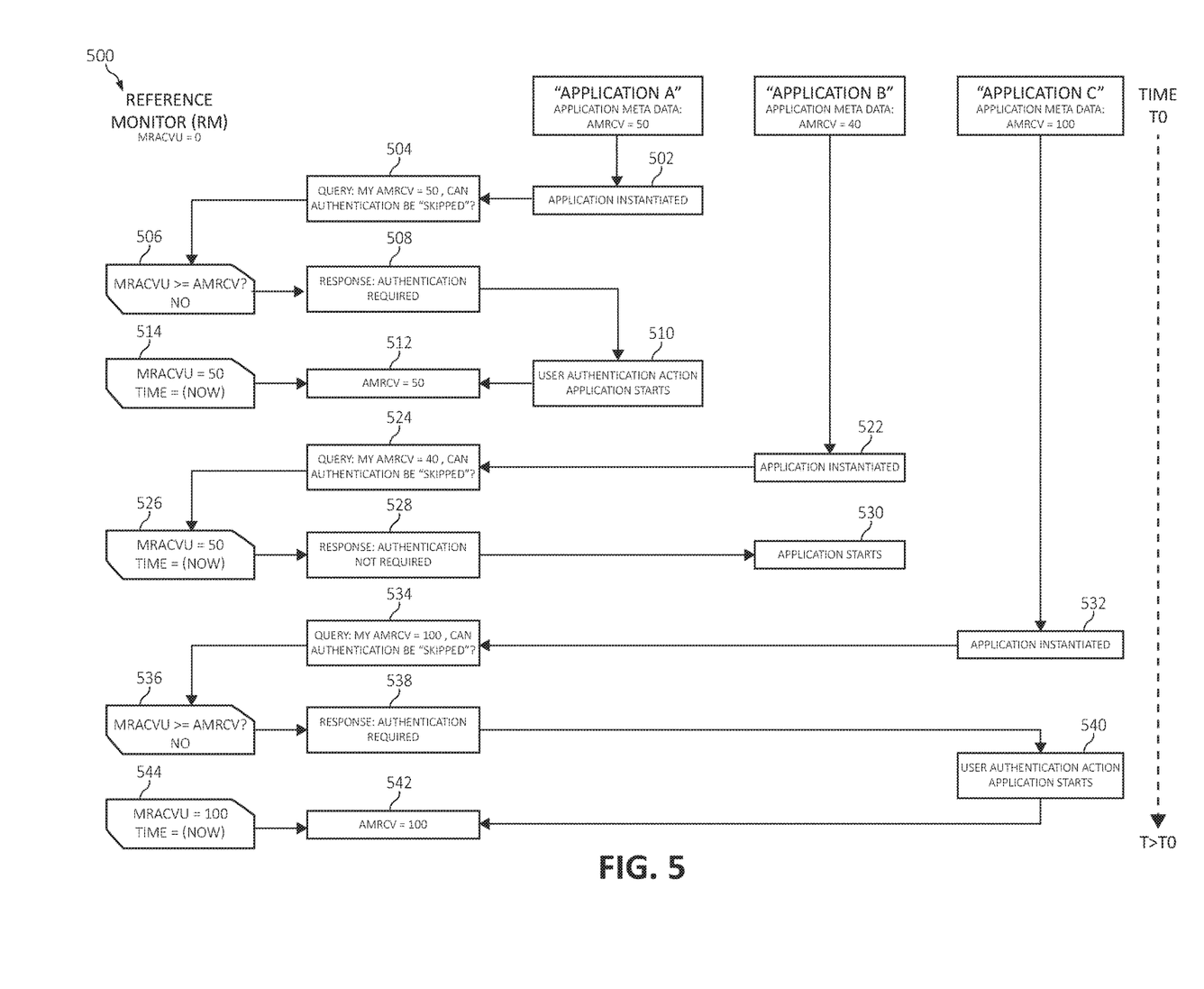
FIG. 5 is a flowchart diagram depicting an exemplary method for inferred access authentication decision for an application in a computing environment in which various aspects of the present invention may be realized.

Turning now to FIG. 5, a block diagram of exemplary functionality 500 relating to inferred access authentication decision for an application is depicted. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIG. 4. With the foregoing in mind, the module blocks 500 may also be incorporated into various hardware and software components of a system for image enhancement in accordance with the present invention. Many of the functional blocks 500 may execute as background processes on various components, either in distributed computing components, or on the user device, or elsewhere.

By way of example only, FIG. 5 illustrates a computing environment having multiple applications such as, for example, application A-C. Starting with block 502, (e.g., for a user having intent to access application A) application A may have an AMRCV of 50 (e.g., 50 being the credential strength of the application process where values may range, for example, from 1 to 100 with 1 being the least strong credential strength and 100 being the strongest credential strength and 50 being a medium value level), and may be instantiated. Thus, each AMRCV is a defined authentication value representing a degree of strength for the credential strength of the application (e.g., how strong do you want the credential to be).

In block 504, a determination operation (e.g., a query) is made to determine if the additional authentication may be skipped. That is, a reference monitor (see the reference monitor component 416 of FIG. 4) may be queried to determine if the additional authentication may be skipped. The MRACVU may be determined to be less than and/or equal to the AMRCV, as in block 506, and thus authentication is required, as in block 508. In block 510, a user authentication action for the application begins. In block 512, the AMRCV is 50 and the MRACVU is determined to be equal to 50 and performed during a selected period of time, as in block 514.

In block 522, (a user having intent to access application B) application B has an AMRCV of 40 (e.g., 40 being the credential strength of the application process), and may be instantiated. Thus, the AMRCV is a defined authentication value representing a degree of strength for the credential strength of the application (e.g., how strong do you want the credential to be).

In block 524, a determination operation (e.g., a query) is made to determine if the additional authentication may be skipped. That is a reference monitored is asked to determine if the additional authentication may be skipped. The MRACVU is determined to be greater than and/or equal to the AMRCV, as in block 526, and the additional authentication is not required, as in block 528. The application may start, as in block 530.

Turning now to block 532, (a user having intent to access application C) application C may have an AMRCV of 100 (e.g., 100 being the credential strength of the application process where values may range, for example, from 1 to 100 with 1 being the least strong credential strength and 100 being the strongest credential strength and 50 being a medium value level), and may be instantiated.

In block 534, a determination operation (e.g., a query) is made to determine if the additional authentication may be skipped. That is, a reference monitor is queried to determine if the additional authentication may be skipped. The MRACVU is determined to be less than and/or equal to the AMRCV, as in block 536, and thus authentication is required, as in block 538. In block 540, a user authentication action for the application begins. In block 542, the AMRCV is 100 and the MRACVU may be determined to be equal to 100 and performed during a selected period of time, as in block 544.

It should be noted that the reference monitor (RM) maintains a most recent authentication credential value used by an application (MRACVU) and time since the MRACVU value was most recently updated. Each application has application metadata, which includes the AMRCV of the application's that is a representation of the credential strength required by the application. Also, FIG. 5 is only one exemplary scenario, but other scenarios may include a time expired and/or keeping record of all AMRCV with an associated time.

That is, in order for the user to have to reauthenticate one or more of the following conditions must occur: 1) a timer since last authentication has expired (regardless of the AMRCV), and/or 2) if the AMRCV of the new application is greater than the last recorded AMRCV. If either of these conditions are met, the user is required to reauthenticate. That is, if a timer has not expired and a new application AMRCV is less than the previous authentication value, then the user does not have to reauthenticate.

Figure 6:
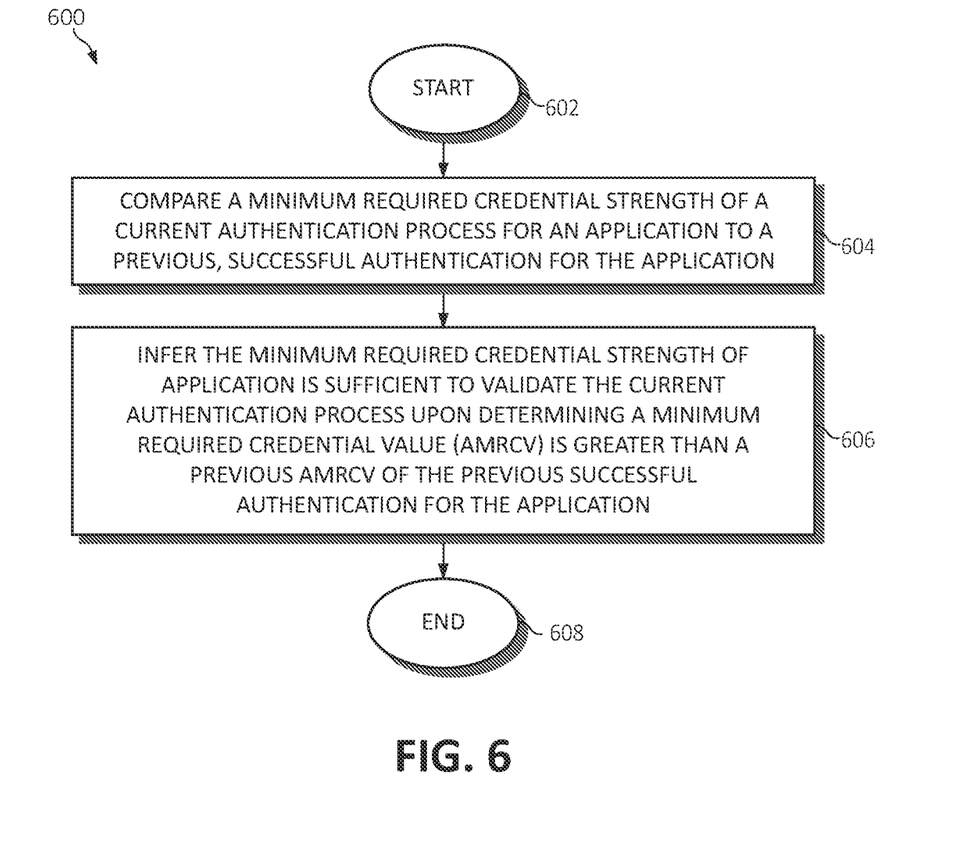
FIG. 6 is an additional flowchart diagram depicting an additional exemplary method for inferred access authentication decision for an application in a computing environment in which various aspects of the present invention may be realized.

Turning now to FIG. 6, a method 600 for implementing an inferred access authentication decision by a processor is depicted, in which various aspects of the illustrated embodiments may be implemented. The functionality 600 may be implemented as a method executed as instructions on a machine, where the instructions are included on at least one computer readable medium or on a non-transitory machine-readable storage medium. The functionality 600 may start in block 602.

A minimum required credential strength of a current authentication process for an application is compared to a previous, successful authentication for the application, as in block 604. The minimum required credential strength of application is inferred to be sufficient to validate the current authentication process upon determining a minimum required credential value (AMRCV) is greater than a predetermined threshold of the previous successful authentication for the application, as in block 606.

The functionality 600 may end, as in block 608. As one of ordinary skill in the art will appreciate, the various steps depicted in method 600 may be completed in an order or version differing from the depicted embodiment to suit a particular scenario.

In one aspect, in conjunction with and/or as part of at least one block of FIG. 6, the operations of functionality 600 may include each of the following. The operations of method 600 may identify the minimum required credential strength for the application using the AMRCV. The current authentication may be granted (e.g., validated and approved) based on the AMRCV being equal to and/or less than a previous AMRCV of the previous successful authentication for the application. A selected period of time may be determined and/or defined for inferring the minimum required credential strength of an application is sufficient to validate the current authentication process. The AMRCV may be stored in metadata to the application and/or a repository (e.g., a third party repository) for establishing the minimum required credential strength.

The operations of method 600 may rank a strength of a minimum required credential value (AMRCV) for the minimum required credential strength; and upon a successful, first authentication to the application for the current authentication, require additional authorization credentials upon determining the ranking of the AMRCV is less than a previous ranking of a previous AMRCV for the previous successful authentication for the application.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for implementing an inferred access authentication decision in a computing environment by a processor device, comprising:
   Instantiating, by the processor device, a first application;
   instantiating a second application, by the processor device, subsequent to instantiating the first application, wherein the first and second applications, respectively, have a minimum required credential strength for authenticating access to functionality associated therewith, wherein the minimum required credential strength is defined and associated with application metadata or the repository database; and
   inferring the minimum required credential strength of the first application is sufficient to validate a current authentication process for the second application upon evaluating a previous, successful authentication for the first application.

2. The method of claim 1, further including identifying the minimum required credential strength for the first application and the second application using a respective minimum required credential value (AMRCV).

3. The method of claim 2, further including:
   requiring additional credentials for the current authentication upon expiration of a selected time period; or
   requiring additional credentials for the current authentication upon determining the AMRCV of the second application is greater than the AMRCV of the first application used during the previous successful authentication for the first application.

4. The method of claim 2, further including granting the current authentication based on the AMRCV of the second application being equal to or less than the AMRCV of the first application used during the previous successful authentication for the first application.

5. The method of claim 2, further including storing the respective AMRCV to metadata within the first application and the second application or within a repository, for establishing the respective minimum required credential strength.

6. The method of claim 2, further including:
   ranking a strength of the respective AMRCV for the respective minimum required credential strength; and
   upon a successful, first authentication to the second application for the current authentication, requiring additional authorization credentials upon determining the ranking of the AMRCV of the second application is less than a previous ranking of the AMRCV of the first application used during the previous successful authentication for the first application.

7. The method of claim 1, further including defining a selected period of time for inferring the minimum required credential strength of the first application is sufficient to validate the current authentication process.

8. A system for implementing an inferred access authentication decision, comprising:
   one or more computers with executable instructions that when executed cause the system to:
   instantiate a first application by a computer of the one or more computers;
   instantiate a second application subsequent to instantiating the first application by the computer of the one or more computers, wherein the first and second applications, respectively, have a minimum required credential strength for authenticating access to functionality associated therewith, wherein the minimum required credential strength is defined and associated with application metadata or repository database; and
   infer the minimum required credential strength of the first application is sufficient to validate a current authentication process for the second application upon evaluating a previous, successful authentication for the first application.

9. The system of claim 8, wherein the executable instructions further identify the minimum required credential strength for the first application and the second application using a respective minimum required credential value (AMRCV).

10. The system of claim 9, wherein the executable instructions further:
    require additional credentials for the current authentication upon expiration of a selected time period; or
    require additional credentials for the current authentication upon determining the AMRCV of the second application is greater than the AMRCV of the first application used during the previous successful authentication for the first application.

11. The system of claim 9, wherein the executable instructions further grant the current authentication based on the AMRCV of the second application being equal to or less than the AMRCV of the first application used during the previous successful authentication for the first application.

12. The system of claim 9, wherein the executable instructions further store the respective AMRCV to metadata within the first application and the second application or within a repository, for establishing the respective minimum required credential strength.

13. The system of claim 9, wherein the executable instructions further:
    rank a strength of the respective AMRCV for the respective minimum required credential strength; and upon a successful, first authentication to the second application for the current authentication, require additional authorization credentials upon determining the ranking of the AMRCV of the second application is less than a previous ranking of the AMRCV of the first application used during the previous successful authentication for the first application.

14. The system of claim 8, wherein the executable instructions further define a selected period of time for inferring the minimum required credential strength of the first application is sufficient to validate the current authentication process.

15. A computer program product for implementing an inferred access authentication decision in a computing system by a hardware processor, the computer program product embodied on a non-transitory computer-readable storage medium having computer-readable program code portions stored therein, the computer-readable program code portions comprising:

an executable portion that instantiates, by the hardware processor, a first application;

an executable portion that instantiates by the hardware processor a second application subsequent to instantiating the first application, wherein the first and second applications, respectively, have a minimum required credential strength for authenticating access to functionality associated therewith, wherein the minimum required credential strength is defined and associated with application metadata or repository database; and an executable portion that infers the minimum required credential strength of the first application is sufficient to validate a current authentication process for the second application upon evaluating a previous, successful authentication for the first application.

16. The computer program product of claim 15, further including an executable portion that identifies the minimum required credential strength for the first application and the second application using a respective minimum required credential value (AMRCV).

17. The computer program product of claim 16, further including an executable portion that:

requires additional credentials for the current authentication upon expiration of a selected time period;

requires additional credentials for the current authentication upon determining the AMRCV of the second application is greater than the AMRCV of the first application used during the previous successful authentication for the first application; or grants the current authentication based on the AMRCV of the second application being equal to or less than the AMRCV of the first application used during the previous successful authentication for the first application.

18. The computer program product of claim 16, further including an executable portion that stores the respective AMRCV to metadata within the first application and the second application or within a repository, for establishing the respective minimum required credential strength.

19. The computer program product of claim 16, further including an executable portion that:

ranks a strength of the respective AMRCV for the respective minimum required credential strength; and upon a successful, first authentication to the second application for the current authentication, requires additional authorization credentials upon determining the ranking of the AMRCV of the second application is less than a previous ranking of the AMRCV of the first application used during the previous successful authentication for the first application.

20. The computer program product of claim 15, further including an executable portion that defines a selected period of time for inferring the minimum required credential strength of the first application is sufficient to validate the current authentication process.

* * * * *